United States Patent [19]

Rudelick

[11] Patent Number: 4,641,685

[45] Date of Patent: Feb. 10, 1987

[54] AXIALLY SYMMETRIC VALVE ASSEMBLY

[75] Inventor: John Rudelick, Milwaukee, Wis.

[73] Assignee: Universal-Rundle Corporation, New Castle, Pa.

[21] Appl. No.: 810,830

[22] Filed: Dec. 19, 1985

Related U.S. Application Data

[63] Continuation of Ser. No. 638,310, Aug. 7, 1984, abandoned.

[51] Int. Cl.$^4$ .................... F16K 11/072; F16K 25/00
[52] U.S. Cl. .............................. 137/625.31; 251/175; 251/176; 251/180; 251/316; 251/363
[58] Field of Search ............... 251/180, 175, 176, 181, 251/185, 286, 316, 317, 360, 363; 137/625.31, 625.32, 454.2, 454.6; 277/53

[56] References Cited

U.S. PATENT DOCUMENTS

| 17,855 | 7/1857 | Gale | 277/53 |
|---|---|---|---|
| 3,831,621 | 8/1974 | Anthony et al. | 137/625.31 X |
| 3,834,416 | 9/1974 | Parkison | 251/180 X |
| 4,126,297 | 11/1978 | Skor et al. | 251/185 X |
| 4,360,040 | 11/1982 | Cove et al. | 137/625.31 X |

FOREIGN PATENT DOCUMENTS

| 759612 | 2/1934 | France | 251/286 |
|---|---|---|---|
| 1461381 | 1/1977 | United Kingdom | 251/317 |

*Primary Examiner*—Martin P. Schwadron
*Assistant Examiner*—John S. Starsiak, Jr.
*Attorney, Agent, or Firm*—Wood, Dalton, Phillips, Mason & Rowe

[57] ABSTRACT

A valve assembly for insertion into a valve body. The valve assembly includes a valve insert adapted to be positioned axially within the valve body. The valve insert has a longitudinally extending fluid passageway therethrough including an inlet opening at one end in communication with a source of fluid under pressure and an outlet opening at the other end remote from the fluid source and includes a seal disposed between the valve insert and the valve body to only permit flow of the fluid through the fluid passageway. In addition, the valve insert includes a sealing surface extending about the outlet opening. The valve assembly also includes a valve stem adapted to be in axially positioned alignment with the valve insert. The valve stem has a stem surface adapted to be positioned in generally parallel closely spaced relation to the sealing surface of the valve insert and is spaced inwardly of the valve body about at least a portion of its periphery to define a fluid passageway between the valve stem and the valve body. In addition, the valve stem has a longitudinally extending seal-receiving bore in the stem surface for selective alignment with the outlet opening in response to rotation of the valve stem. The valve assembly further includes a resilient seal extending from the seal-receiving bore for compressed sealing engagement with the sealing surface of the valve insert. With this arrangement, the valve assembly is closed and open when the seal-receiving bore and resilient seal are aligned and not aligned with the outlet opening, respectively.

12 Claims, 9 Drawing Figures

AXIALLY SYMMETRIC VALVE ASSEMBLY

This is a continuation of copending application Ser. No. 638,310 filed on Aug. 7, 1984 now abandoned.

BACKGROUND OF THE INVENTION

The present invention generally relates to a valve assembly and, more particularly, to an axially symmetric faucet valve assembly for insertion into a valve body communicating with a pressurized fluid source.

In the past, valve assemblies of many different types and configurations have been proposed. Such assemblies have, unfortunately, oftentimes been very complicated and contained numerous parts which were difficult and expensive to manufacture and also required considerable maintenance and repair. With regard to valve assemblies for water faucets, the problems have been aggravated by the rapidly expanding do-it-yourself market in the field of home improvements.

In particular, water faucets have generally fallen into two major categories, i.e., screw stem and nonrise valve. The screw stem type of water faucet has largely been replaced by nonrise valve faucets which has significantly reduced the extent and frequency of repairs required by reason of the elimination of sealing washers on discs adapted to be threaded out of and into contact with valve seats to open and close the valves. In contrast, the nonrise valve faucets, which are commonly known as "washerless", utilize spring-loaded seals.

In one type of nonrise valve for faucets and the like, the valve assembly includes a valve insert in a valve body carrying the spring loaded seals. A valve stem having a rotary sealing plate is also disposed within the valve body such that the spring loaded seals cooperate with the sealing plate to seal the valve when the plate is in the "off" position. Unfortunately, the spring loaded seals, which wear much better than the replaceable sealing washers utilized in screw stem faucets, must nevertheless occasionally be replaced.

When replacement becomes necessary, the spring loaded seals must be removed from the valve insert inside the valve body. This is usually a most difficult task, especially for the do-it-yourselfer with little experience and limited manual dexterity, since the seals are quite small, relatively tight fitting, and disposed fairly deeply within the limited diameter opening in the valve body. As a result, it has remained to enhance the ease with which nonrise valve faucets can be repaired in the event that it is necessary to replace the spring loaded seals.

SUMMARY OF THE INVENTION

Accordingly, the present invention is directed to an axially symmetric valve assembly for insertion into a valve body. The valve assembly includes an axially symmetric valve insert adapted to be positioned axially within the valve body. The valve insert has a longitudinally extending fluid passageway therethrough including an inlet opening at one end in communication with a source of fluid under pressure and an outlet opening at the other end remote from the fluid source and includes seal means disposed between the valve insert and the valve body to only permit flow of the fluid through the fluid passageway. In addition, the valve insert includes a sealing surface extending about the outlet opening. The valve assembly also includes an axially symmetric valve stem adapted to be in axially positioned alignment with the valve insert. The valve stem has a stem surface adapted to be positioned in generally parallel closely spaced relation to the sealing surface of the valve insert and is spaced inwardly of the valve body about at least a portion of its circumferential extent to define a fluid passageway between the valve stem and the valve body. In addition, the valve stem has a longitudinally extending seal-receiving bore in the stem surface for selective alignment with the outlet opening in response to rotation of the valve stem. The valve assembly further includes resilient seal means extending from the seal-receiving bore for compressed sealing engagement with the sealing surface of the valve insert. With this arrangement, the valve assembly is closed and open when the seal-receiving bore and resilient seal means are aligned and not aligned with the outlet opening, respectively.

More particularly, the outlet opening in the valve insert is preferably eccentrically positioned to extend longitudinally into the valve insert in spaced parallel relation to the axis of the valve insert. Also, the seal-receiving bore in the stem surface is preferably eccentrically positioned to extend longitudinally into the valve stem in spaced parallel relation to the axis of the valve stem.

In a preferred embodiment, the resilient seal means includes a generally cylindrical seal having a longitudinally extending opening therethrough in generally coaxial relation to the seal-receiving bore. Spring means is also advantageously provided within the seal-receiving bore to cooperatively engage and bias the generally cylindrical seal for compressed sealing engagement with the sealing surface of the valve insert. Moreover, the valve stem preferably includes a counterbore in the stem surface with the bore being adapted to receive the spring means and the counterbore being adapted to receive the generally cylindrical seal.

The generally cylindrical seal advantageously includes an internal shoulder adapted for engagement by the spring means. The spring means then acts against the inner extent of the bore and the internal shoulder of the generally cylindrical seal, which also preferably has an outer surface disposed in sealed relation to the surface defining the counterbore in the valve stem. More particularly, the outer surface of the generally cylindrical seal advantageously includes a plurality of ribs for this purpose.

In the preferred embodiment, the valve insert preferably includes a pair of the longitudinally extending outlet openings disposed symmetrically. The fluid passageway then extends from the inlet opening at one end to the outlet openings at the other end. Moreover, the valve stem preferably includes a corresponding pair of longitudinally extending seal-receiving bores disposed symmetrically.

With this arrangement, the valve stem is rotatable for selective alignment of the seal-receiving bores with the outlet openings. The valve stem includes resilient seal means in the form of generally cylindrical seals extending from each of the seal-receiving bores and having openings extending longitudinally in generally coaxial relation to the seal-receiving bores. As will be appreciated, the valve assembly is closed and open when the seal-receiving bores and resilient seal means are aligned and not aligned with the outlet openings, respectively.

More particularly, the outlet openings in the valve insert are preferably symmetrically positioned to extend longitudinally in spaced parallel relation to the axis of the valve insert. Similarly, the seal-receiving bores in the valve stem are symmetrically positioned to extend longitudinally in spaced parallel relation to the axis of the valve stem.

In addition, the valve insert preferably includes generally cylindrical and symmetrical upper and lower body portions with the upper body portion having a greater diameter than the lower body portion to form a shoulder adapted to rest upon a shoulder in the valve body. Advantageously, means are also provided for preventing rotation of the valve insert within the valve body during rotation between the valve stem and the valve insert to permit selective alignment of the seal-receiving bores and resilient seal means with the outlet openings. Advantageously, the rotation preventing means includes a key associated with one of the valve insert and valve body and a keyway associated with the other of the valve insert and valve body.

Additional details may include the valve stem being generally cylindrical in shape and having a symmetrical intermediate body portion of lesser diameter than the maximum lateral dimension of upper and lower body portions thereof. The intermediate body portion of the valve stem defines a symmetrical expanded fluid chambers adapted to be disposed adjacent an outlet in the valve body and the seal-receiving bore is disposed in the lower body portion of the valve stem. Still additional details will include the valve body being generally cylindrical in shape and having a greater inner diameter than the maximum lateral dimension of the lower body portion so as to be spaced outwardly therefrom.

In the preferred embodiment, the upper body portion of the valve stem includes seal means disposed between the valve stem and the valve body, means are provided for retaining the valve stem within the valve body, and stop means are provided for limiting rotation of the valve means within the valve body. It is also advantageous for the intermediate body portion of the valve stem to include an opening extending therethrough in alignment with the outlet in the valve body when the valve assembly is open so that fluid is adapted to flow around and through the symmetrical expanded fluid chamber defined by the intermediate body portion to the outlet in the valve body to limit pressure loss and maintain the velocity of fluid flow. Additionally, the upper body portion of the valve stem preferably includes means for rotating the valve stem within the valve body such as a stem portion extending from the upper body portion of the valve stem adapted to receive a knob for rotating the valve stem within the valve body.

Still other objects, advantages and features of the present invention will be apparent from a consideration of the details of construction and operation set forth in the accompanying specification, claims and drawings.

BRIEF DESCRIPTION OF THE DRAWINGS

In the drawings, like reference numerals identify like elements in the several views, in which.

DESCRIPTION OF THE PREFERRED EMBODIMENT

Figure 4:
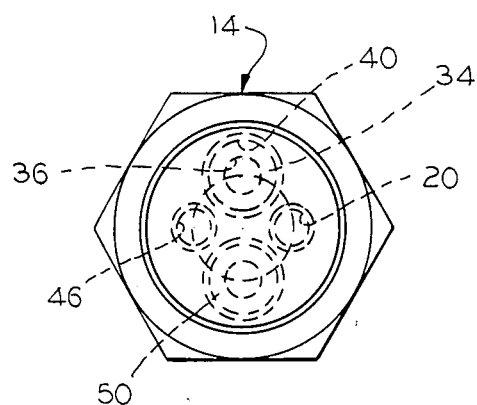
FIG. 4 is a cross sectional view taken on the line 4—4 of FIG. 3.
Figure 1:
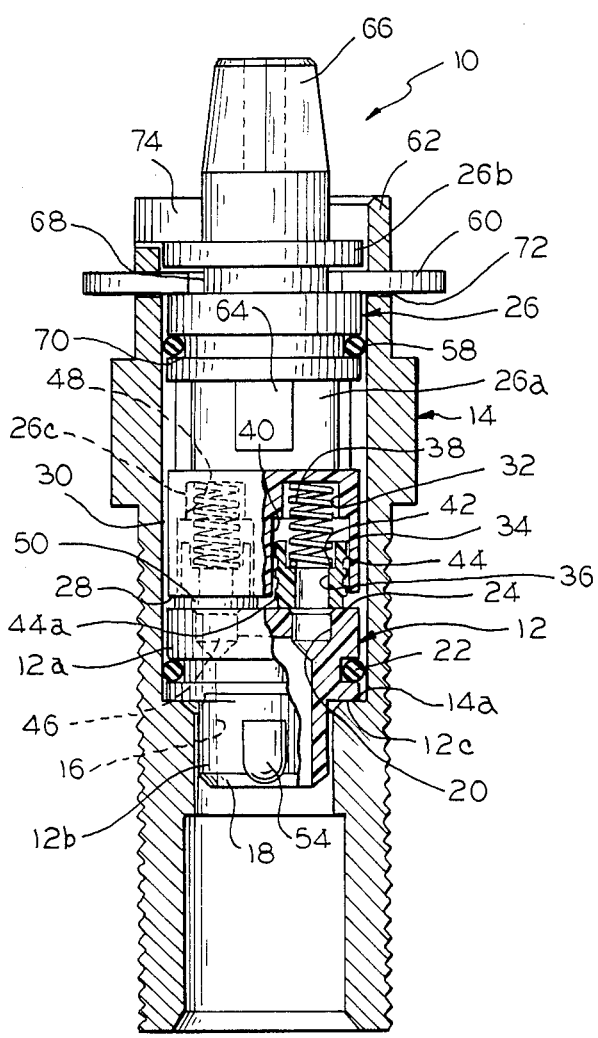
FIG. 1 is a partial cross-sectional view of axially symmetric valve assembly in the closed position in accordance with the present invention.

Referring to the drawings, and first to FIG. 1, the reference numeral 10 designates generally axially symmetric assembly in accordance with the present invention. The valve assembly 10 includes axially symmetric valve insert 12 adapted to be positioned axially within a valve body 14. The valve insert 12 has a longitudinally extending fluid passageway 16 therethrough including an inlet opening 18 at one end in communication with a source of fluid under pressure and an outlet opening 20 at the other end remote from the fluid source and includes seal means preferably in the form of an O-ring 22 disposed between the valve insert 12 and the valve body 14 to only permit flow of the fluid through the fluid passageway 16. In addition, the valve insert 12 includes a sealing surface 24 (see FIG. 9) extending about the outlet opening 20. The valve assembly 10 also includes axially symmetric valve stem 26 adapted to be in axially positioned alignment with the valve insert 12. The valve stem 26 has a stem surface 28 adapted to be positioned in generally parallel closely spaced relation to the sealing surface 24 of the valve insert 12 and is spaced inwardly of the valve body 14 about at least a portion of its circumferential extent to define a fluid passageway 30 between the valve stem 26 and the valve body 14. In addition, the valve stem 26 has a longitudinally extending seal-receiving bore 32 in the stem surface 28 (see FIG. 5) for selective alignment with the outlet opening 20 in response to rotation of the valve stem 26. The valve assembly 10 further includes resilient seal means preferably in the form of the generally cylindrical seal 34 extending from the seal-receiving bore 32 for compressed sealing engagement with the sealing surface 24 of the valve insert 12. With this arrangement, the valve assembly 10 is closed and open when the seal-receiving bore 32 and generally cylindrical seal 34 are aligned and not aligned with the outlet opening 20, respectively (see FIGS. 1, 3 and 4).

Figure 9:
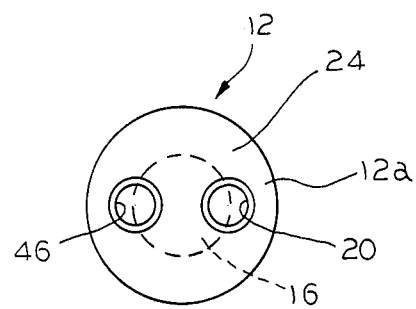
FIG. 9 is a top plan view of the valve insert illustrated in FIG. 7.
Figure 7:
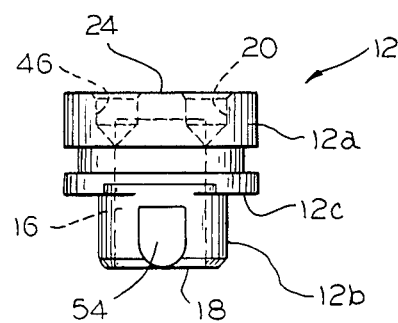
FIG. 7 is a front elevational view of a valve insert in accordance with the present invention.

Referring to FIGS. 7 and 9, the outlet opening 20 in the valve insert 12 is preferably positioned (i.e., non-axially positioned) to extend longitudinally into the valve insert 12 in spaced parallel relation to the axis of the valve insert 12. Also, referring to FIGS. 5 and 6, the seal-receiving bore 32 in the stem surface 28 is preferably positioned (i.e., non-axially positioned) to extend longitudinally into the valve stem 26 in spaced parallel relation to the axis of the valve stem 26.

Referring to FIG. 1, the generally cylindrical seal 34 has a longitudinally extending opening 36 therethrough in generally coaxial relation to the seal-receiving bore 32. Spring means, such as the coil spring 38, is also advantageously provided within the seal-receiving bore 32 to cooperatively engage and bias the generally cylindrical seal 34 for compressed sealing engagement with the sealing surface 24 of the valve insert 12. Also, referring to FIGS. 1, 5 and 6, the valve stem 26 includes a counterbore 40 in the stem surface 28 with the bore 32 being adapted to receive the coil spring 38 and the counterbore 40 being adapted to receive the generally cylindrical seal 34.

As shown, the generally cylindrical seal 34 includes an internal shoulder 42 adapted for engagement by the coil spring 38. The coil spring 38 then acts against the inner extent of the bore 32 and the internal shoulder 42 of the generally cylindrical seal 34, which also preferably has an outer surface 44 disposed in sealed relation to the surface defining the counterbore 40 in the valve stem 26. In particular, the outer surface 44 of the generally cylindrical seal 34 advantageously includes a plurality of ribs 44a for this purpose.

As shown throughout the drawings, the valve insert 12 preferably includes a pair of longitudinally extending symmetrically disposed outlet openings 20 and 46. The fluid passageway 16 then extends from the inlet opening 18 at one end to the outlet openings 20 and 46 at the other end. Moreover, the valve stem 12 preferably includes symmetrically disposed a corresponding pair of longitudinally extending seal-receiving bores 32 and 48.

With this arrangement, the valve stem 26 is rotatable for selective alignment of the seal-receiving bores 32 and 48 with the outlet openings 20 and 46. The valve stem 26 also includes generally cylindrical seals 34 and 50 extending from each of the seal-receiving bores 32 and 48, respectively, and having symmetrically disposed openings 36 and 52 extending longitudinally in generally coaxial relation to the seal-receiving bores 32 and 48, respectively. As will be appreciated, the valve assembly 10 is closed and open when the seal-receiving bores 32 and 48 and generally cylindrical seals 34 and 50 are aligned and not aligned with the outlet openings 20 and 46, respectively.

More particularly, the outlet openings 20 and 46 in the valve insert 12 are preferably symmetrically positioned (i.e., non-axially positioned) to extend longitudinally in spaced parallel relation to the axis of the valve insert 12. Similarly, the seal-receiving bores 32 and 48 in the valve stem 26 also are symmetrically positioned (i.e., non-axially positioned) to extend longitudinally in spaced parallel relation to the axis of the valve stem 12.

As will be appreciated by referring to FIG. 7, the valve insert 12 preferably includes generally cylindrical symmetrical upper and lower body portions 12a and 12b with the upper body portion 12a having a greater diameter than the lower body portion 12b to form a shoulder 12c adapted to rest upon a shoulder 14a in the valve body 14. Means are also provided for preventing rotation of the valve insert 12 within the valve body 14 during rotation of the valve stem 26 but permitting relative rotation between the valve stem 26 and the valve insert 12 to permit selective alignment of the seal-receiving bores 32 and 48 and generally cylindrical seals 34 and 50 with the outlet openings 20 and 46, respectively. In the preferred embodiment, the rotation preventing means includes a key 54 associated with one of the valve insert 12 and valve body 14 (preferably the valve insert 12) and a complementary keyway (not shown) associated with the other of the valve insert 12 and valve body 14 (preferably the valve body 14).

Figure 5:
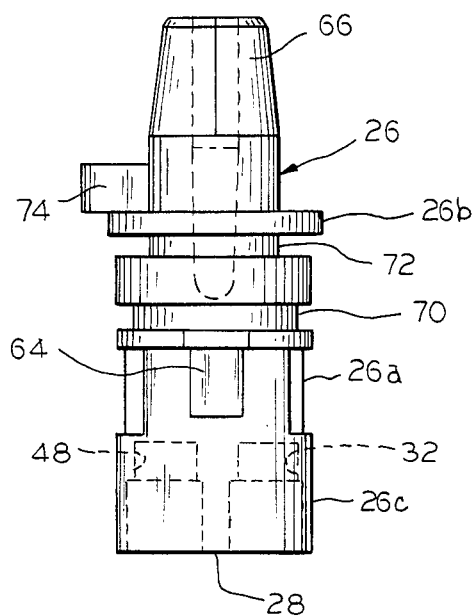
FIG. 5 is a front elevational view of a valve stem in accordance with the present invention.
Figure 6:
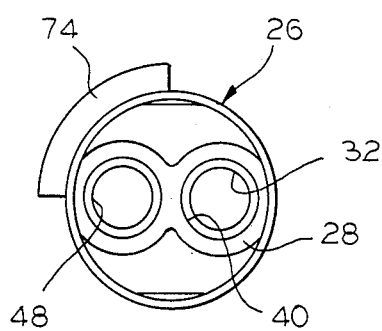
FIG. 6 is a bottom plan view of the valve stem illustrated in FIG. 5.

Referring to FIGS. 5 and 6, the valve stem 26 preferably is generally cylindrical in shape and has a symmetrical intermediate body portion 26a of lesser diameter than the maximum lateral dimension of upper and lower body portions 26b and 26c thereof. The intermediate body portion 26a which defines a symmetrical expanded fluid chamber 55 adapted to be disposed adjacent an outlet 56 in the valve body 14 and the seal-receiving bores 32 and 48 are disposed in the lower body portion 26c. Also, the valve body 14 preferably is generally cylindrical in shape and has a greater inner diameter than the maximum lateral dimension of the lower body portion 26c so as to be spaced outwardly therefrom.

Figure 8:
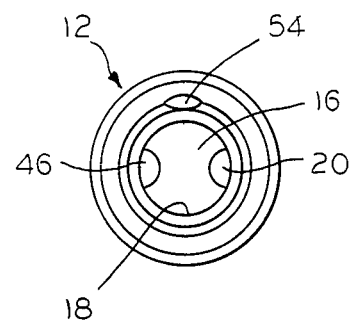
FIG. 8 is a bottom plan view of the valve insert illustrated in FIG. 7.

As shown in FIG. 1, the upper body portion 26b includes seal means such as the O-ring 58 disposed between the valve stem 26 and the valve body 14, means are provided for retaining the valve stem 26 within the valve body 14 such as the retainer clip 60, and stop means are provided for limiting rotation of the valve stem 26 within the valve body 14 such as the semicircular upstanding flange 62. It should also be noted that the valve body 14 is preferably spaced outwardly from the lower body portion 26c about its entire periphery (which is generally in the shape of a "figure 8") so that fluid is adapted to flow between the lower body portion 26c and the valve body 14, and it will be seen that the intermediate body portion 26a includes an opening 64 extending therethrough in alignment with the outlet 56 in the valve body 14 when the valve assembly 10 is open so that fluid is adapted to flow around and through the intermediate body portion 26a to the outlet 56 in the valve body 14 to limit pressure loss and maintain the velocity of fluid flow. In addition, the upper body portion 26b preferably includes means for rotating the valve stem 26 within the valve body 14 such as a stem portion 66 extending from the upper body portion 26b of the valve stem 26 adapted to receive a knob (not shown) for rotating the valve stem 26 within the valve body 14.

Figure 2:
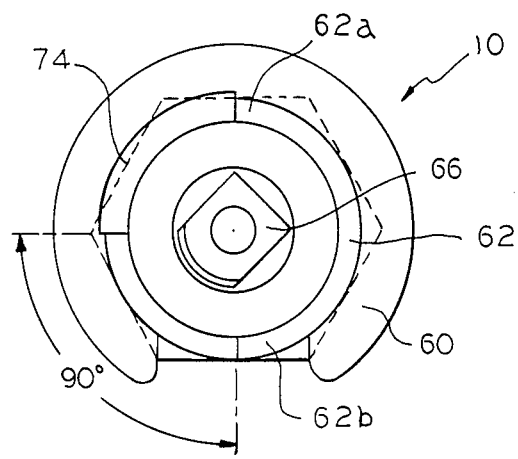
FIG. 2 is a top plan view of the valve assembly illustrated in FIG. 1.
Figure 3:
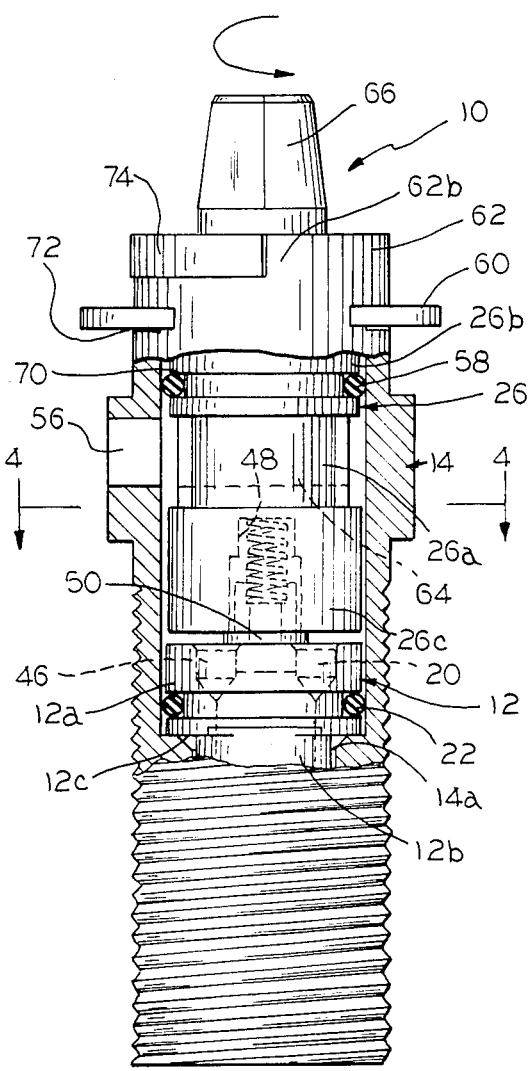
FIG. 3 is a partial cross sectional view of a valve assembly in the open position in accordance with the present invention.

Still referring to FIG. 1, the upper body portion 26b includes a pair of circumferential grooves 68 and 70 adapted to cooperate with the O-ring 58 and retainer clip 60, respectively. It will also be appreciated, of course, that the valve body 14 includes a slot 72 extending partially about the circumferential extend of the valve body 14 whereby the retainer clip 60 may be transversely moved into a retaining position as shown in FIGS. 1 through 3 and substantially as taught in commonly owned U.S. Pat. No. Re. 30,559, the teaching of which is incorporated herein by reference. As shown, the slot 72 is disposed above the O-ring 58 so as to be isolated from the fluid to prevent leakage.

Referring to FIGS. 1 and 2, the stop means for limiting rotation of the valve stem 26 within the valve body 14 can be more fully understood. It will be seen that the stop means not only includes the semicircular upstanding flange 62, which is an integral part of the valve body 14, but also includes a corresponding arc-shaped lug 74 adapted to contact opposite ends of the semicircular upstanding flange 62 when the valve assembly is fully open and fully closed, respectively. In particular, the end 62a of the flange 62 is contacted by the lug 74 when the valve assembly is fully closed and the end 62b of the flange 62 is contacted by the lug 74 when the valve assembly is fully open (see FIG. 3).

With the present invention, a unique axially symmetric valve assembly for insertion into a valve body in communication with a fluid source has been provided. The valve assembly is particularly adapted for use in faucets of the washerless nonrise valve type and utilizes relatively few parts which are inexpensive to manufacture and require limited maintenance and repair. Moreover, the maintenance and repair is easy, especially for the do-it-yourselfer with little experience and limited manual dexterity, because of the availability of total access to the spring loaded seals.

While in the foregoing specification a detailed description of the invention has been set forth for purposes of illustration, variations of the details herein given may be made by those skilled in the art without departing from the spirit and scope of the invention as defined by the appended claims.

I claim:

1. An axially symmetric valve assembly for insertion into a valve body, comprising:

an axially symmetric valve insert adapted to be positioned axially within said valve body, said valve insert having a pair of symmetrically disposed longitudinally extending fluid passageways including an inlet opening at one end in communication with a source of fluid under pressure and said fluid passageways and a pair of symmetrically disposed outlet openings at the other end remote from said fluid source and including seal means disposed between said valve insert and said valve body to only permit flow of said fluid through said symmetrically disposed fluid passageways, said valve insert including a sealing surface extending about said symmetrically disposed outlet openings;

an axially symmetric valve stem adapted to be in axially positioned alignment with said valve insert, said valve stem having a stem surface adapted to be positioned in generally parallel closely spaced relation to said sealing surface of said valve insert, said valve stem being spaced inwardly of said valve body about at least a portion of its circumferential extent to define a symmetrical fluid passageway between said valve stem and said valve body and having a pair of symmetrically disposed longitudinally extending seal-receiving bores in said stem surface, said valve stem being rotatable for selective alignment of said symmetrically disposed bores with said symmetrically disposed outlet openings;

said symmetrically disposed outlet openings in said valve insert extending longitudinally in spaced parallel relation to the axis of said axially symmetric valve insert and said symmetrically disposed seal-receiving bores in said axially symmetric valve stem also extending longitudinally in spaced parallel relation to the axis of said axially symmetric valve stem;

said axially symmetric valve stem being generally cylindrical in shape and having symmetrical upper and lower body portions and a symmetrical intermediate body portion, said symmetrical intermediate body portion being of lesser diameter than the maximum lateral dimension of said symmetrical lower body portion to define a symmetrical expanded fluid chamber and being disposed such that said symmetrical expanded fluid chamber is adjacent an outlet in said valve body, said symmetrically disposed seal-receiving bores being disposed in said symmetrical lower body portion of said axially symmetric valve stem;

said valve body being generally cylindrical in shape and having a greater inner diameter than the maximum lateral dimension of said symmetrical lower body portion, said valve body being spaced outwardly from said symmetrical lower body portion substantially about its entire periphery, said fluid being adapted to flow between said symmetrical lower body portion and said valve body and into said symmetrical expanded fluid chamber defined by said symmetrical intermediate body portion and through said outlet in said valve body;

symmetrically disposed resilient seal means extending from said symmetrically disposed seal-receiving bores for compressed sealing engagement with said sealing surface of said axially symmetric valve insert;

means for preventing rotation of said valve insert within said valve body during rotation of said valve stem, said rotation preventing means permitting relative rotation between said valve stem and said valve insert, said relative rotation permitting selective alignment of said seal-receiving bores and resilient seal means with said outlet openings;

whereby said axially symmetric valve assembly is closed when said symmetrically disposed seal-receiving bores and symmetrically disposed resilient seal means are aligned with said symmetrically disposed outlet openings and said axially symmetric valve assembly is open when said symmetrically disposed seal-receiving bores and symmetrically disposed resilient seal means are not aligned with said symmetrically disposed outlet openings.

2. The valve assembly as defined by claim 1 wherein said resilient seal means includes a pair of generally cylindrical seals each having a longitudinally extending opening therethrough, said openings in said generally cylindrical seals extending longitudinally in generally coaxial relation to said seal-receiving bores.

3. The valve assembly as defined by claim 2 including spring means within said seal-receiving bores cooperatively engaging said generally cylindrical seals, said spring means biasing said generally cylindrical seals for compressed sealing engagement with said sealing surface of said valve insert.

4. The valve assembly as defined by claim 3 wherein said valve stem includes a pair of counterbores in said stem surface, said bores being adapted to receive said spring means, said counterbores being adapted to receive said generally cylindrical seals.

5. The valve assembly as defined by claim 4 wherein each of said generally cylindrical seals include an internal shoulder adapted for engagement by said spring means, said spring means acting against the inner extent of said bores and said internal shoulders of said generally cylindrical seals.

6. The valve assembly as defined by claim 5 wherein each of said generally cylindrical seals includes an outer surface disposed in sealed relation to the surface defining said counterbores in said valve stem.

7. The valve assembly as defined by claim 6 wherein said outer surface of each of said generally cylindrical seals includes a plurality of ribs sealingly engaging the surface defining said counterbores in said valve stem.

8. The valve assembly as defined by claim 1 wherein said valve insert includes generally cylindrical upper and lower body portions, said upper body portion having a greater diameter than said lower body portion to form a shoulder therebetween, said shoulder of said valve insert being adapted to rest upon a shoulder in said valve body.

9. The valve assembly as defined by claim 1 wherein said rotation preventing means includes a key associated with said valve insert for insertion into a keyway associated with said valve body.

10. The valve assembly as defined by claim 1 wherein said intermediate body portion includes an opening extending therethrough, said opening in said intermediate body portion being disposed in alignment with said outlet in said valve body when said valve assembly is open, said fluid being adapted to flow around and through said intermediate body portion to said outlet in said valve body.

11. The valve assembly as defined by claim 1 wherein said upper body portion includes seal means disposed between said valve stem and said valve body, said upper body portion also including means for retaining said valve stem within said valve body, said upper body portion further including stop means for limiting rotation of said valve means within said valve body.

12. The valve assembly as defined by claim 11 wherein said upper body portion further includes means for rotating said valve stem within said valve body, said rotating means including a stem portion extending from said upper body portion of said valve stem, said stem portion being adapted to receive a knob for rotating said valve stem within said valve body.

* * * * *